United States Patent [19]

Nicoll

[11] 4,418,918

[45] Dec. 6, 1983

[54] STATIC SEAL DEVICE WITH PLASTICALLY DEFORMABLE METAL FOR CRYOGENIC REFRIGERATORS

[75] Inventor: Harry G. Nicoll, Norwell, Mass.

[73] Assignee: Helix Technology Corporation, Waltham, Mass.

[21] Appl. No.: 475,239

[22] Filed: Mar. 14, 1983

[51] Int. Cl.[3] .................... F16J 15/08; F16L 19/02
[52] U.S. Cl. .................... 277/1; 277/167.5; 277/166; 277/188 R; 277/189; 285/348; 285/422; 285/DIG. 18; 285/DIG. 24
[58] Field of Search ............... 277/1, 9, 9.5, 27, 236, 277/188 R, 188 A, 167.5, 189, 166; 285/348, 422, DIG. 18, DIG. 24

[56] References Cited

U.S. PATENT DOCUMENTS

| | | | |
|---|---|---|---|
| 1,678,946 | 7/1928 | Joyce | 277/236 X |
| 1,983,977 | 12/1934 | Geiger | 277/188 R X |
| 2,075,947 | 4/1937 | Kennedy | 277/188 R X |
| 2,365,774 | 12/1944 | Pool | 277/188 R |
| 2,960,198 | 11/1960 | Keefe | 277/236 X |
| 3,186,743 | 6/1965 | Russell | 277/236 X |
| 3,291,510 | 12/1966 | Kody | 285/348 X |

FOREIGN PATENT DOCUMENTS 990438 4/1965 United Kingdom ............... 277/236

Primary Examiner—Robert S. Ward, Jr.
Attorney, Agent, or Firm—Hamilton, Brook, Smith and Reynolds

[57] ABSTRACT

A face seal positioned between a first threaded member 12 and a second threaded member 10. The face seal provides effective sealing between rotatably secured members of a cryogenic refrigerator. The face seal comprises a seal space 32 formed by dual recess 18, 19 and 20, 21 on the first 12 and second 10 members. Disposed within the seal space is a triangular anti-rotation ring 24 and a packing member 22. The seal may be disposed upon a flange 48 in such a manner as to allow pressurized gas from a chamber 64 to pressurize the seal space 32. Further, the flange may be angled so as to apply a preset spring force upon the seal space. Alternatively, the anti-rotation ring may be a tubular member incorporating an angled flange to be positioned in a chamfer on one of the seal faces.

24 Claims, 9 Drawing Figures

STATIC SEAL DEVICE WITH PLASTICALLY DEFORMABLE METAL FOR CRYOGENIC REFRIGERATORS

DESCRIPTION

1. Technical Field

This invention relates to static face seals and more particularly to seals suitable for use in mechanical components of cryogenic refrigerators which subject joints to high gaseous pressures and widely variable temperature excursions.

2. Background

Static face seals are required between mechanical components of cryogenic refrigerators in order to prevent leakage of pressurized fluid. Pressurized cryogenic devices utilize closed thermodynamic cycles. In order to maintain efficiency, the components of these systems need to be sealed against leakage from pressurized areas to unpressurized areas.

The most common seals used in pressurized devices, such as cryogenic refrigerators, are O-rings and gaskets composed of elastomeric compounds. These seals are generally positioned within mating grooves or recesses in adjacent parts. It has been found that when such seals are subjected to high and low temperature and pressure excursions, unacceptable leakage occurs. Leakage occurs due to the exposure of the elastomeric compounds to adverse temperature and pressure conditions which result in seal disintegration. The leakage thus caused results in a loss of efficiency and failure of devices utilizing high pressure thermodynamic cycles.

A solution to the problem of the failure of elastomeric seals has been found in the use of various metallic, plastically deformable seals. Generally, metallic seal rings are placed in recesses between adjacent parts. These recesses are designed in a manner that forces the metallic seals to plastically flow and seal any gaps between parts when the parts are secured to one another. Depending on the temperature and pressure to be maintained and the environment in which the seal must operate, different metallic substances ae selected as seal material. Examples of these substances include industrial silver, platinum, gold, and indium. While these seals have been found far more effective in high pressure and high temperature environments than elastomeric seals, they have not been without problems.

Metallic seals must plastically flow to seal gaps between adjacent parts. This requires extremely precise dimensioning and assembly of parts, to insure that the flow of plastic seal material is properly directed for sealing purposes. The volume in which the seal is placed must be properly related to seal material volume so that uninterrupted contact may be made between the seal and the adjacent parts. Too large a seal space volume will result in gaps between the parts and cause leaks. If the seal space volume is too small, excess seal material can prevent proper seating of adjacent parts. This results in deterioration or loss of seal material during system operations. Loss of seal material occurs because improper seating of parts allows seal material to come into direct contact with the extreme environments to which the parts are subjected. Loss of seal material also occurs if parts are misassembled in a manner whereby the seal material is not properly placed within the recesses designed for it. Exposure of seals to extreme environments results in deterioration of the relatively soft metal seals.

Problems with use of the above mentioned seals are exacerbated when such seals are used in cold ends of cryogenic refrigerators. Seals in this usage are subjects to pressures below $5 \times 10^{-11}$ torr and temperatures below 12° K. Any flaws in seal material positioning and sealing can provide unacceptable leakage paths for the very small molecules of helium gas normally used in cryogenic refrigerators. Helium gas is expanded and thus cooled in order to produce the low cryogenic operating temperatures.

In an effort to overcome similar problems, various manufacturers have tried varying the volume of space in which seals are placed, the relationship between the sides of the recesses limiting that volume, and the shape of seal rings themselves. An example of this may be found in U.S. Pat. No. 3,297,718 issued to Hansen. In this patent, the inventor experimented with a circular seal volume and rectangular seal as a solution to sealing problems in environments similar to those discussed above. While such seals may be an improvement, it is not enough of an improvement to make the seal acceptable for use in cryogenic refrigerators. Further, the manufacture of special seals and intricately shaped recesses restricts use of this solution and is expensive to build.

A further problem in the use of metallic face seals is that their use is restricted by a tendency of the seal to bunch up or flow in a non-sealing manner when two parts are rotatably assembled. A cost effective method of mating separate parts is through the use of external screw threads on one part and internal threads on a second part. This male-female fit utilizes the rotation of one part into the interior of the other by means of threads. Threaded assembly methods require less parts and less machining than bolt circles and are therefore less costly to manufacture and assemble. Metallic seals, however, tend to rotate with the part being screwed down. This results in an uncontrolled plastic flow of the seal material which produces ineffective sealing. For that reason, this type of mating method is not often used with metallic seals. Rather, parts to be sealed are often manufactured with bolt circles or welded together, at much greater expense.

A need therefore exists for an improvement in metallic sealing devices for cryogenic refrigerators that would improve their effectiveness through control of seal material outflow.

SUMMARY OF THE INVENTION

In accordance with the principles of this invention a face seal for components of a cryogenic refrigerators comprises an annular recess positioned on a mating face of a first component. A second component which defines an enclosed space for the confinement of pressurized gas is assembled to the first component of the cryogenic refrigerator. The recess defining an enclosed seal space between the assembled first and second components encloses an angular anti-rotation ring and plastically deformed seal material which together form a tight seal between said first and second components.

The anti-rotation ring has a bearing surface which allows for rotation of either the first or second member relative to the ring while eliminating rotation of the packing material relative to adjacent surfaces during assembly of the members. The packing material is plastically deformed in a uniform fashion about the anti-rotation ring during assembly of the members.

In the preferred embodiment of the invention the anti-rotation seal has at least one notch facing the packing material upon its surface which aids in restricting relative rotation of packing material. Further, the preferred embodiment utilizes an indium alloy as the packing material.

The recess which comprises the seal space in the preferred embodiment may be described as dual recesses, positioned on both components. A base recess is positioned within a wider upper recess to form a dual stepped recess. The base recess serves to centrally position the anti-rotating ring so that the packing material will properly seal.

In its preferred usage the seal is used to maintain helium gas within a confined space of a cryogenic refrigerator. The first and second components are constructed so as to be rotatably secured through the use of male and female threads.

In an alternate embodiment of the invention the seal space is disposed upon a flange and the underside of said flange is exposed to pressurized gas. The pressurized gas causes the flange to apply a force upon the seal space which furthers its effectiveness.

The flange may also be constructed so as to apply a preset force upon the seal. This has been accomplished by angling the flange slightly in the direction of the opposite mating surface. As a result the flange applies a preset spring force as the male member is rotatably secured upon the flange. The preset spring force is a small force which allows for easy assembly and disassembly of the two members while maintaining an effective seal particularly at low chamber pressure before chamber pressure can be used to pressurize the flange as described above.

In an alternative embodiment, the anti-rotation ring is shaped as a tubular member equipped with an angled flange. Seal material is positioned between the anti-rotation ring and a chamfer in one member. The seal material flows in a controlled manner between the angled surfaces of the chamfer and the flange of the anti-rotation ring to cause effective sealing as detailed above.

BRIEF DESCRIPTION OF THE DRAWINGS

The foregoing and other features and advantages of the invention will be apparent from the following more particular description of the preferred embodiment of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
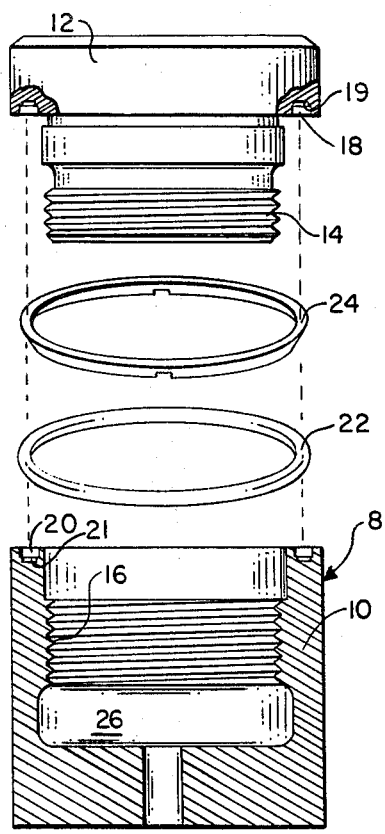
FIG. 1 is an exploded view of a cold end from a cryogenic refrigerator which has a seal incorporating the invention. The female portion of the cold end and selected areas of the male portion are shown in cross section.

FIG. 1 shows a specific device in which a seal comprising this invention substantially reduces gas leakage and makes possible simplified assembly of adjacent parts. The device shown is a section of a cryogenic refrigerator, specifically the cold end which is pressurized with helium gas.

The exploded view of FIG. 1 discloses the prime elements and aspects of the seal arrangement. Device 8 comprises a female cold end containing a chamber 26 for the storage of gas. Cap 12 is rotatably secured by means of threads 14 onto the cold end 10, which has internal threads 16 to form chamber 26.

Both the cold end 10 and the cap 12 are manufactured with dual recesses 20, 21 and 18, 19 used to contain seal material. Alternatively, a sufficiently deep recess may be machined in only one member. In order to form a tightly sealed chamber, packing, or seal material, 22 is placed within the recess 20 in the female cold end 10. Preferably, that packing is indium. On top of the packing 22 is placed an anti-rotation ring 24. After the ring 24 is placed on the packing, cap section 12 is rotatably secured to the cold end 10. The anti-rotation ring and seal material fill the seal space formed by the recesses 18, 19, and 20, 21.

Figures 2, 3:
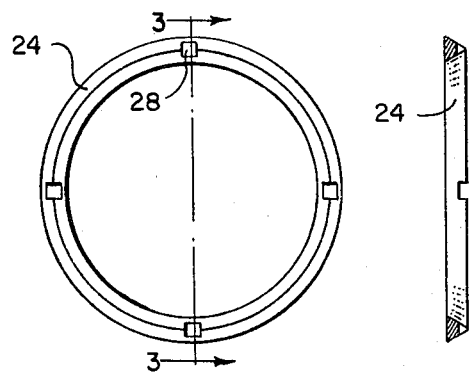
FIG. 2 is a plan view of an anti-rotation ring.
FIG. 3 is a cross section of the anti-rotation ring taken along lines 3—3 of FIG. 2.

The details of the anti-rotation ring and the packing arrangement are more specifically shown in reference to FIGS. 2, 3, 4, and 5. FIG. 2 is a plan view of the anti-rotation ring 24. FIG. 3 is a cross section of the anti-rotation ring taken along lines 3—3 of FIG. 2.

The anti-rotation ring 24 is a continuous ring of triangular cross section dimensioned to fit within the space provided by the dual recess 18, 19, and in the cap 12, dual recess 20, 21 in the cold end 10. The cap dual recess consists of a base recess 19, and an upper recess 18. The cold end dual recess consists of a base recess 21 and an upper recess 20. Notches 28 are provided in the ring to prevent rotation between the ring and the seal material 22 as the top portion 12 of the cold end is rotatably inserted into the bottom portion 10.

Figure 4:
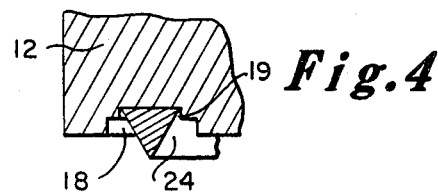
FIG. 4 is an enlarged cross section of the area of the top of the cold end containing the anti-rotation ring.
Figure 5:
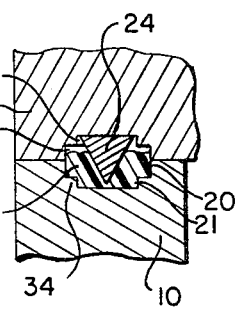
FIG. 5 is an enlarged cross section of an area of the assembled cold end containing the anti-rotation ring and seal material.

FIG. 4 shows the anti-rotation ring sitting within base recess 19 of the top portion 12. Base recesses 19, 21 (FIG. 5) serve to properly center the anti-rotation ring and to further direct the flow of packing during assembly. The recesses are assembled to form a seal space 32 which retains and directs the packing. The ring is assembled with the top portion as shown in FIG. 5. As the top portion 12 is screwed down into the lower portion 10, seal material 22 flows about the point of the ring 24 to fully fill the seal space 32. As is shown in FIG. 5, the ring 24 is of smaller axial length than the seal space 32 formed by the assembly of the pieces 10 and 12. The plastic flow of seal material is thereby controlled to reliably block any leakage of pressurized gas across the faces 30 to zones of lower or ambient pressure.

In the type of part assembly described above, a tight seal would not be formed if only seal material were inserted into the recesses between the parts. Without the anti-rotation ring, seal material flow during assembly would be uncontrolled and the seal material would tend to collect in random circumferential locations as a reaction to the rotation of the top piece. Non-uniform flow of seal material results in poor sealing.

The anti-rotation notches 28 on the crown of the triangular ring 24 help prevent rotation of the ring relative to the seal material. As the parts are assembled, the anti-rotation ring is pushed into the indium alloy packing which has been placed on the static part 10. Rotary movement is limited to the rotating cap 12. The lowest friction surface provided is at the smooth top surface of the ring; thus, the rotating cap 12 slides over the ring. The relatively high friction seal material is sandwiched between two surfaces in a manner which avoids rotation of seal material relative to its adjacent surfaces. The invention makes use of the fact that the movement always occurs at the site providing the lowest resistance, or friction. The invention thereby provides a method of sealing two threaded parts without disrupting seal integrity.

The triangular shape of the ring 24 serves to assure uniform sealing distribution of the seal material 24. The ring directs the plastic flow of the material evenly toward the interface of the adjacent pieces so that gaps are filled in a manner which prevents gas flow.

Threaded assemblies of two parts is considerably easier to machine to a high accuracy of flatness than bolt circle type flanges. They also are less likely to flex with the pressures encountered in cryogenic refrigerators, than most bolted flanges because the added surface area of the threads spreads stress over a larger area than bolt heads. Threaded assemblies with indium seal material provide a large improvement in sealing over bolted arrangement. Formerly, many sealed chambers used in cryogenic refrigerators needed to be welded together for sufficiently airtight sealing since bolted assemblies tended to leak at unacceptable levels. Welding is a costly and inaccurate process compared with the threaded assembly of structures comprising this invention. The invention through improved sealing, extends the use of airtight chambers assembled without welding.

Figure 6:
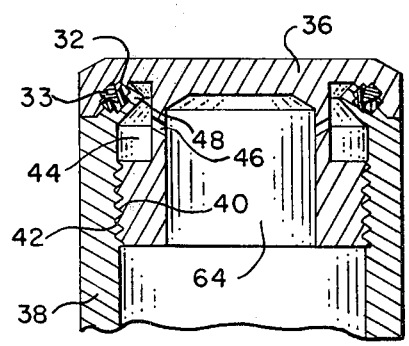
FIG. 6 is a cross section of a cold end incorporating a second embodiment of the invention.
Figure 7:
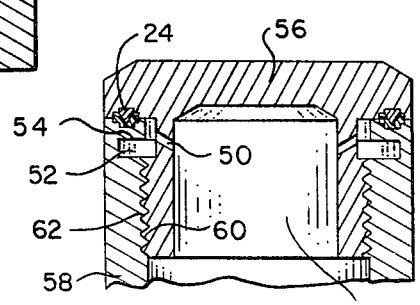
FIG. 7 is a cross section of a cold end incorporating yet another embodiment of the invention.

Yet a further improvement in sealing may be achieved through use of further embodiments of the invention as shown in FIGS. 6 and 7.

FIG. 6 shows a male and female union of components which define an enclosed space 64. The closed space contains pressurized helium gas in a cryogenic refrigeration system. In the cross section of FIG. 6, top cap 36 is rotatably attached to cold end 38 much the same as in the device discussed above. Threads 40 screw down into threads 42 on the cold end 38.

The significant difference in this embodiment is the placement of the seal space 32, anti-rotation ring 33 and seal material 22. The seal space 32 is placed at an angle above a flange 48. The anti-rotation ring 33 has conical base section to properly fit within the angled seal space 32. Behind the flange 48 is an annulus 44 which communicates, through opening 46, with the internal confined area 64.

The purpose of the flange 48 is as follows. As chamber area 64 is filled with a pressurized gas, pressurized gas flows through hole 46 into the space 44. This pressure tends to cause flange 48 to press against the seal area of the top piece 36 and thereby improve sealing.

Flange 48 is free standing and cantilevered from the wall of the bottom portion 38. The relatively thick top piece 36 is restrained from flexure to a much larger extent than the flange 48. Therefore, as high pressure gas enters space 64, an increasing force is applied to flange 48, tightening the seal against cap 36. The tighter the seal space is held, the less likely it is that gaps may occur between the seal material 22 and its adjacent parts. As before, the anti-rotation ring 33 has been used to provide uniform distribution of the seal material and prevent relative rotation of the packing and adjacent parts.

Since fluid pressure acts outward in all directions, the force upon the seal is equivalent to the pressure inside the volume 44 times the area of the conical surface exposed to pressurized fluid on the base of flange 48. The resultant force produces a tight seal by its action upon the seal space. The seal area is thereby bound tighter than could have otherwise been accomplished without over tightening the threads 40, 42 in a manner that would make disassembly of adjacent parts difficult.

FIG. 7 shows a similar system which works on the same principles as the system shown in FIG. 6. Space 52 is filled with pressurized gas through hole 50. As the pressure rises in space 64, an equivalent pressure rise occurs in space 52. The high pressure forces flange 54 tightly against the seal surface of the cap 56. As detailed above, cap 56 is held by threads 60 and 62 into bottom piece 58. The cap 56 has been rotatably attached with a seal identical to that discussed in regard to FIG. 2 through 5. As before, the seal ring 24 restrains the seal material from rotation with the top 56.

Both flange 48 (FIG. 6) and flange 54 (FIG. 7) may be constructed to apply a preset spring force upon the cap seal surfaces. This is accomplished by angling the upper surfaces of the flanges slightly towards the cap surfaces. As an example, if cap 56 (FIG. 7) was assembled to bottom portion 38 (FIG. 6), flange 48 would apply a preset spring force upon the sealing area. In reality, the flange should only be angled at about one degree in order to preset a small force which still allows for easy assembly. The preset spring force aids in maintaining a seal integrity particularly at low internal chamber pressures.

Figure 8:
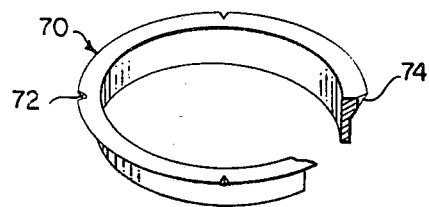
FIG. 8 is a perspective view of an alternate embodiment of the anti-rotation ring.
Figure 9:
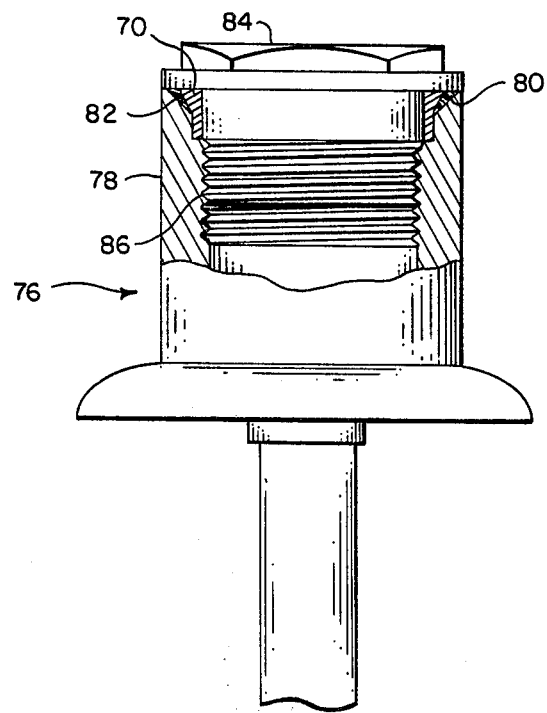
FIG. 9 is a cross section of a further embodiment of the invention incorporating the anti-rotation ring of FIG. 8.

FIG. 8 is a perspective view of an alternative embodiment of the anti-rotation ring 70 with a portion of the ring broken away. In this embodiment a tubular ring is equipped with a conical flange 74 upon which are positioned anti-rotation notches 72. The anti-rotation ring 70 acts in the same manner as the anti-rotation ring described above. However, it is designed for a differently shaped seal space shown in FIG. 9. The cross section of FIG. 9 shows assembled pieces of a cold end 76 of a cryogenic refrigerator.

The seal space in this embodiment comprises a recess, or chamfer, 82 on the face of the base female member 78. Onto the chamfer is placed the indium seal material 80 and the anti-rotation ring 70 before assembly of the cap 84. The anti-rotation ring is pressed down against the packing material 80 by a die to provide the initial flow of packing material and to preset the notches 72 into the packing. The cap 84 is then rotatably secured onto the internal threads 86 of the female member 78. Tightening the cap forces the indium seal material to flow in a controlled manner while preventing its relative rotation against adjacent surfaces. The anti-rotation ring forms a bearing surface upon which the upper member 84 is rotatably secured. The ring, the seal material and the lower member 78 do not rotate relative to each other. A tight seal is thereby formed between the two adjacent angled surfaces formed by the chamfer 82 and the anti-rotation ring flange 74.

It has thus been shown that a seal anti-rotation ring may be used with various types of seals and seal materials. Tight sealing is most necessary in portions of cryogenic refrigerators where wide ranges of temperatures and high pressures are encountered. For example, in a device similar to that disclosed in FIG. 1, an indium seal was installed with an anti-rotation ring as shown. The container was tested with 600 psi helium and at temperature extremes between $-65°$ F. and $150°$ F. In all ranges, excellent sealing was maintained and the leakage rate was always lower than $3 \times 10^{-8}$ p.p.m. It is thought that similar results can be obtained with different gases and different usages. It is also thought that similar improvements can be made with seal materials other than indium. This belief is based upon the knowledge that helium gas is one of the most difficult gases to contain since it has among the smallest molecules of any gas.

While the invention has been particularly shown and described with reference to preferred embodiments thereof, it will be understood by those skilled in the art that various changes of formal details may be made therein without departing from the spirit and scope of the invention as described in the appended claims.

I claim:

1. A face seal for sealing first and second components of a cryogenic refrigerator which define an enclosed chamber for the containment of pressurized gas comprising:
   a. the first component having an annular recess on a mating face at a radius from a center line;
   b. the second component having a mating face which forms a seal space with the first member when the mating faces of the two components are brought together;
   c. a packing member comprising an annulus of material at the same radius as the seal space; and
   d. an anti-rotation ring of the same radius as the annular seal space for insertion into said seal space, said ring having a bearing surface to allow rotation of one of the first and second components relative thereto and a wedge section for plastically deforming the packing member to form a seal between said first and second components.

2. The face seal recited in claim 1 wherein said packing member comprises an indium alloy.

3. The face seal of claim 1 wherein said anti-rotation ring has at least one notch upon its surface so as to restrict anti-rotation ring rotation relative to the packing member.

4. The face seal of claim 1 wherein said seal space formed between the first and second components is disposed upon a flange of said second component, and said flange is exposed to pressurized gas so as to apply force upon the seal space of the first component when gas is held in a pressurized state in a chamber formed between said first and second components.

5. The face seal of claim 1 wherein the seal recesses are further characterized by a base recess positioned within a wider upper recess.

6. A face seal for sealing between first and second component of a cryogenic refrigerator which define an enclosed chamber for the containment of pressurized gas comprising:
   a. the first component having an annular recess on a mating face at a radius from a center line;
   b. the second component assembled to the first component to form a seal space with the first component at the mating faces;
   c. an anti-rotation ring of the same radius as the annular seal space positioned within said seal space, said ring having a wedge shaped cross section; and,
   d. an annulus of packing material disposed within said seal space and plastically deformed by said first and second components and said anti-rotation ring so as to effectively form a seal between said first and second components.

7. The seal recited in claim 5 wherein said packing member comprises an indium alloy.

8. The seal recited in claim 5 wherein said recesses on said first and second components comprise dually stepped recesses wherein base recesses are positioned within upper recesses which are shallower and wider than said base recesses.

9. The seal of claim 5 wherein said seal space is disposed upon a flange which is at a preset angle relative to a mating surface on the component to which it abuts in a manner which results in a preset spring force being applied onto the seal space to improve sealing.

10. The seal of claim 5 wherein said anti-rotation ring is triangular in cross section and has at least one notch upon its surface so as to further restrict its rotation relative to the packing.

11. The seal recited in claim 5 wherein said anti-rotation ring comprises a section with a conical flange.

12. The seal recited in claim 6 wherein said seal contains flow of pressurized helium gas in cryogenic refrigerators contained within the enclosed chamber formed by said first and second components.

13. The seal of claim 5 wherein said seal space formed between the first and second components is disposed upon a flange of one of the members, and said flange is exposed at a flange face to pressurized gas from a chamber formed between the two members, in a manner which causes the flange to apply force upon the seal space.

14. A face seal for sealing between a first and second members comprising:
   a. an annular recess disposed upon a seal face of the first member;
   b. the second member assembled to the first member to form a seal space with the recess of the first member;
   c. an anti-rotation ring of angular cross section positioned within the seal space formed between the first and second member; and,
   d. plastically deformed metallic seal material retained within the seal space formed by the first and second members, said seal material restricting gas passage between said first and second members.

15. The seal of claim 11 wherein said seal material comprises an indium alloy.

16. The seal of claim 11 wherein said first member is externally threaded, and said second member is internally threaded so that said first member may be rotatably secured to said second member;

17. The seal of claim 11 wherein said anti-rotation ring has at least one notch upon its surface to restrict rotation relative to the seal material.

18. The seal of claim 11 wherein said first and second members are components of a cryogenic refrigerator.

19. A method of sealing a confined chamber of gas within at least two components of a cryogenic refrigerator comprising the steps of:

a. placing a ring of seal material into a recess in a mating face of a first threaded component;

b. placing an anti-rotation ring upon said seal material and in the recess of said first threaded component; and, c. rotatably securing a second component upon said first component such that seal material plastically flows in a controlled manner within a seal space formed by the first and second components and little relative rotation occurs between the anti-rotation ring and the seal material as the parts are assembled.

20. The method of securing a gas within a confined space as recited in claim 19 wherein said seal material comprises an indium alloy.

21. The method of sealing gas in a confined space recited in claim 19 wherein said anti-rotation ring comprises a conical section having at least one notch positioned upon the section to prevent relative rotation of seal material.

22. The method of sealing a gas in a confined space recited in claim 19 wherein said confined gas is primarily helium.

23. The method of sealing a gas in a confined space recited in claim 19 wherein the seal space is disposed upon a flange of one of the components and is exposed to a pressurized gas in a manner which produces force upon the flange in the direction of its abutting adjacent component in a manner which enhances sealing.

24. A cryogenic refrigerator having a face seal for containing helium, the refrigerator comprising:

a. a first threaded cap component;

b. a second threaded component having an annular recess positioned so as to form a seal space between said components, said recess disposed upon a flange which is exposed to pressurized gas from a pressure chamber formed between said two threaded components, in a manner which causes the flange to apply a force upon the seal face;

c. an anti-rotation ring comprising a wedge section positioned in the seal space formed between the two components, said ring having a notch upon its surface; and d. indium packing material disposed within said seal space and plastically deformed by said first and second components and said anti-rotation ring when said members are rotatably secured, in a manner which results in effective sealing between said components.

* * * * *